United States Patent
Stolten et al.

(10) Patent No.: US 7,183,015 B2
(45) Date of Patent: Feb. 27, 2007

(54) FUEL CELL STACK WITH CIRCUIT

(75) Inventors: Detlef Stolten, Aachen (DE); Hendrik Dohle, Stolberg (DE); Jürgen Mergel, Jülich (DE); Helmut Baltruschat, Bonn (DE)

(73) Assignee: Forschungszentrum Julich GmbH, Julich (DE)

( * ) Notice: Subject to any disclaimer, the term of this patent is extended or adjusted under 35 U.S.C. 154(b) by 526 days.

(21) Appl. No.: 10/432,183

(22) PCT Filed: Nov. 6, 2001

(86) PCT No.: PCT/DE01/04195

§ 371 (c)(1),
(2), (4) Date: May 19, 2003

(87) PCT Pub. No.: WO02/43174

PCT Pub. Date: May 30, 2002

(65) Prior Publication Data

US 2004/0028962 A1 Feb. 12, 2004

(30) Foreign Application Priority Data

Nov. 21, 2000 (DE) ................................ 100 57 679

(51) Int. Cl.
*H01M 8/00* (2006.01)
*H01M 8/04* (2006.01)

(52) U.S. Cl. .............................. 429/17; 429/13; 429/34
(58) Field of Classification Search ................... None
See application file for complete search history.

(56) References Cited

U.S. PATENT DOCUMENTS

| 3,653,969 | A | | 4/1972 | Titterington et al. | |
|---|---|---|---|---|---|
| 5,904,740 | A | * | 5/1999 | Davis ........................... | 44/385 |
| 6,280,865 | B1 | * | 8/2001 | Eisman et al. ................. | 429/17 |

FOREIGN PATENT DOCUMENTS

| JP | 03043964 | 2/1991 |
|---|---|---|
| WO | WO 00/16425 | 3/2000 |

* cited by examiner

*Primary Examiner*—Patrick Joseph Ryan
*Assistant Examiner*—Robert Hodge
(74) *Attorney, Agent, or Firm*—Jonathan Myers; Andrew Wilford

(57) ABSTRACT

In a direct-methanol fuel cell stack with an at least partial circulation (7, 9) of the fuel, according to the invention a means is arranged in this circulation for reducing the concentration of an undesired byproduct. This means is comprised especially of a further electrochemical cell (8) to which electric current is applied and which at least partly transforms the byproducts by an electrochemical reduction reaction again to methanol and water. Since the concentration of byproducts is small, the loss in electric current required for the additional reduction reaction has no noticeable effect on the efficiency of the fuel cell stack.

4 Claims, 1 Drawing Sheet

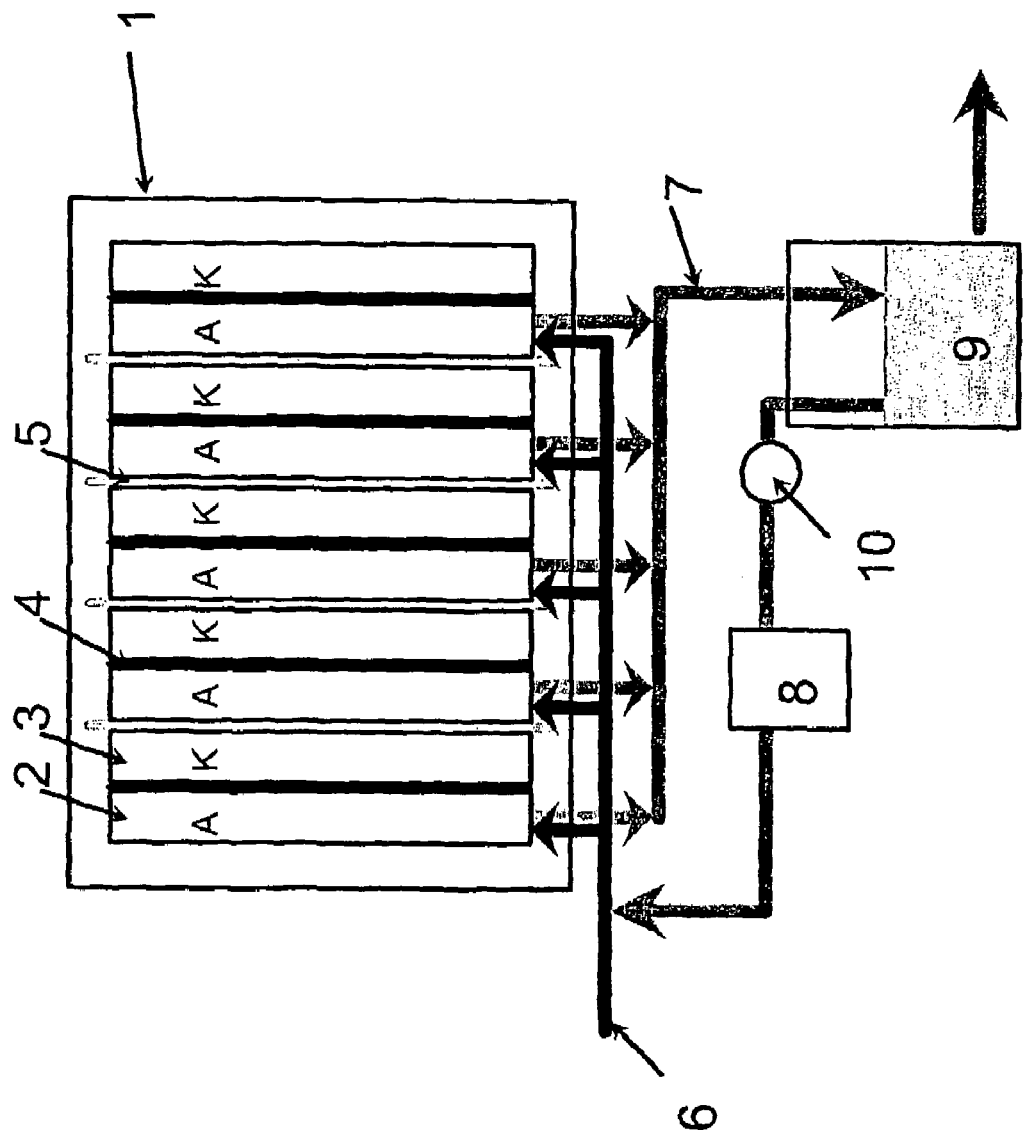
Figure

FUEL CELL STACK WITH CIRCUIT

CROSS REFERENCE TO RELATED APPLICATIONS

This application is a national stage of PCT/DE01/04195 filed 6 Nov. 2001 and is based upon German national application 100 67 679.6 of 21 Nov. 2000 under the International Convention.

FIELD OF THE INVENTION

The invention relates to a fuel cell stack in which the fuel is at least in part fed in a circulation.

STATE OF THE ART

A fuel cell has a cathode, electrolyte and an anode. In a hydrogen fuel cell, the cathode is supplied with an oxidizing agent, for example in the form of air, and the anode is supplied with a fuel, for example in the form of hydrogen.

Multiple fuel cells are as a rule connected together electrically and mechanically by connecting elements for producing greater electrical outputs. By means of bipolar plates, fuel cells are stacked one above another and connected electrically in series. These arrangements are termed fuel cell stacks. They are comprised of the bipolar plates and the electrode-electrolyte units.

From the literature, fuel cells and fuel cell stacks are known which, apart from the supply and discharge passages for the operating media, have available an additional circulating path for the fuel (anode side circulation). This means that the fuel fed to the anode compartment, which usually is not completely electrochemically converted, is at least partly recycled. As a result the fuel can be more effectively utilized. For carrying out the recycling, a recirculating tank and a recirculating pump are provided.

For a direct-methanol fuel cell, the fuel is supplied in the form of a methanol-water mixture. With an anode side recycling of the fuel, the depleted, that is partly converted, methanol-water mixture, is withdrawn from the anode compartment. A part of this mixture is discharged. The remaining part is restored to the starting concentration by the addition of pure methanol. The thus formed methanol-water mixture can then be fed again to the fuel cells.

It has been found that with a direct-methanol fuel cell, apart from the desired electrochemical conversion of the fuel at the anode, there are undesirable side reactions. The byproducts resulting from these side reactions are typically discharged with the nonconverted fuel from the fuel cell. With an anode side circulation, however, these byproducts which are formed tend to become concentrated in the recycle with time. Formaldehyde and formic acid especially are the typical byproducts which arise. As a result of the concentration of these byproducts, these byproducts have a negative effect on the durability of the fuel cell and usually increase the requirements for the quality of the materials from which the fuel cell is made. This gives rise especially to a reduced economy of the system. Simultaneously the potential which is developed at the anode is usually negatively influenced by the presence of byproducts.

OBJECTS OF THE INVENTION

An object of the invention is to provide a fuel cell stack with a recirculation in which the above-mentioned drawback can be avoided.

Further it is an object of the invention to provide a method of operating such a fuel cell stack.

SUMMARY OF THE INVENTION

The objects of the invention are attained with a fuel cell stack and, particularly, a methanol fuel cell stack with a recirculation of the fuel. The fuel cell stack according to the invention has at least one means for reducing the concentration of at least one of the byproducts in the fuel cell recycle.

With a direct-methanol fuel cell stack, a methanol-water mixture is used as the fuel. By a recycling of the fuel it is to be understood that the fuel which is not completely converted, after leaving the anode compartments, is at least partly returned to a fuel cell of the fuel cell stack. Since the concentration of methanol is reduced by the electrochemical conversion at the anode, advantageously by addition of methanol, the starting concentration of methanol is restored before the fuel is fed to a further fuel cell.

As byproducts all chemical compounds are to be considered which are not given directly by the following conversion reaction:

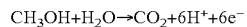
$$CH_3OH + H_2O \rightarrow CO_2 + 6H^+ + 6e^-$$

This means all compounds aside from water, methanol and CO2 count in the scope of this invention as the byproducts. Especially the compounds formaldehyde (CHOH) and formic acid (CHOOH) belong to this class. During the recirculation these concentrations of these byproducts in the fuel recycle increases. A means for reducing the concentration of at least one of the byproducts is, for example, a further electrochemical cell or also an adsorber, an absorber or also a filter.

In an advantageous configuration, the fuel cell stack has a device which enables at least one of the byproducts to be electrochemically transformed. Especially, the fuel cell stack according to the invention has a further electrochemical cell as the device for electrochemically converting at least one of the byproducts. Advantageously this is an electrochemical cell which is constructed like a direct-methanol fuel cell. This is arranged in a suitable manner in the fuel circulation. Since the circulation of byproducts is relatively small by comparison to the fuel, the electrochemical cell for converting the byproduct usually can be significantly smaller in construction than the fuel cells of the stack used for electric current generation.

Within the framework of the invention it has been found that a reversal of the anodic reaction which takes place in a fuel cell can be used to reduce byproducts which can arise in a fuel cell stack with fuel recirculation in a regular manner. It is thus possible to hold the concentration of byproducts during the operation of the fuel cell to a low level and prevent a concentration of them.

The method of the invention for operating a direct methanol fuel cell stack with at least partial circulation of the fuel encompasses the following steps:

Fuel which has at least one byproduct, is at least partly fed to a further electrochemical cell.

In this further electrochemical cell at least one product is at least partly electrochemically converted by a reducing reaction.

Thus only partly converted fuel which contains undesired byproducts can be fed in a suitable manner to a device in which an electrochemical conversion of at least one of the byproducts is carried out.

Advantageously, as a further electrochemical cell, a direct-methanol fuel cell is used. As a result, by the application of an appropriate electric current to this electrochemical cell, the anode reaction of a current generating direct methanol fuel cell is carried out in reverse (reduction reaction), and at least one byproduct is electrochemically transformed thereby.

In this further electrochemical cell methanol can be produced. The methanol is produced by the electrochemical conversion of one or more byproducts together with water as the reverse of the anode reaction in a fuel cell stack. Since the concentration of the byproducts by comparison with fuel concentration in the fuel circulation is low, the fuel cell used for transforming the byproduct can be significantly smaller than the fuel cells which are used for electric current generation in the stack.

The current which is applied to the additional fuel cell serves for the electrochemical transformation of at least one byproduct. The electric current required for this purpose is small compared with the electric current generated in the fuel cell stack so that the effectiveness of the entire system is not significantly reduced by the additional fuel cell. However, because of concentration of byproducts in the fuel circulation is held low, the potential at the anode is advantageously scarcely affected in a negative manner and the determining influence of the byproduct on the materials of the fuel cell stack is uniformly precluded.

BRIEF DESCRIPTION OF THE DRAWING

The sole FIGURE of the accompanying drawing is the diagrammatic cross section through a fuel cell stack showing the flow paths.

SPECIFIC DESCRIPTION

In the drawing, a fuel cell stack 1 has respective anode compartments A, one of which is shown at 2 and respective cathode compartments K, one of which is shown at 3 for a respective fuel cell of the stack. One anode compartment 2 and the cathode compartment 3 of each fuel cell of the stack is the electrolyte 4 as has been described and between fuel cells of the stack respective bypolar plates 5 are provided.

A supply channel 6 communicates with the anode compartment 2 and a discharge channel 7 communicates with these compartments for carrying off depleted fuel. The oxygen supply to the cathode compartments has not been shown.

According to the invention, a circulating tank 9 collects the depleted fuel and a circulating pump 10 recycles a portion of the depleted fuel through an additional electrochemical cell 8 which produces, in the case of a direct methanol fuel cell, methanol which is fed as the fuel to line 6 for return to the stack.

The invention claimed is:

1. A method of operating a direct methanol fuel cell stack, comprising:
   providing a fuel cell stack with at least two fuel cells;
   feeding methanol as a fuel to said fuel cells so that at least one byproduct is formed therein;
   feeding said methanol fuel together with at least one said byproduct at least partly to a further electrochemical cell having its polarity reversed and supplied with an external current source; and
   in this further electrochemical cell converting at least one byproduct in a reaction at least partly electro-chemically.

2. The method according to claim 1 in which an electrochemical cell which corresponds in construction to a direct methanol fuel cell, is used as the further electrochemical cell.

3. The method according claim 1 in which the electrochemical conversion reaction in the further electrochemical cell produces methanol.

4. A direct methanol fuel cell stack, comprising:
   (a) at least two fuel cells;
   (b) a circulation for the fuel; and
   (c) a further electrochemical cell having its polarity reversed and supplied with an external current source and corresponding in construction to a direct methanol fuel cell as a means for reducing concentration of at least one by-product in the fuel circulation, by electrochemical conversion of the by-product.

* * * * *